United States Patent [19]

Saunders

[11] 4,382,339

[45] May 10, 1983

[54] BOW SQUARE

[75] Inventor: Charles A. Saunders, Columbus, Nebr.

[73] Assignee: Saunders Archery Co., Columbus, Nebr.

[21] Appl. No.: 280,342

[22] Filed: Jul. 6, 1981

[51] Int. Cl.³ .......................... F41G 1/00; G01B 3/30
[52] U.S. Cl. .................................. 33/265; 33/174 R; 33/180 R
[58] Field of Search ............... 33/174 R, 265, 180 R; 124/1, 90, 86, 23 R, 24 R

[56] References Cited

U.S. PATENT DOCUMENTS

| 2,763,156 | 9/1956 | Garigal | 124/24 R |
| 3,088,212 | 5/1963 | Smith | 124/23 R |
| 3,600,814 | 8/1971 | Smith | 124/23 R |

Primary Examiner—Willis Little
Attorney, Agent, or Firm—Michael G. Berkman

[57] ABSTRACT

A bow square for checking and adjusting the bracing height, nocking point and kisser location of an archery bow. The device is generally T-shaped and includes a scale-marked bar for bracing height measurement, and a transversely extending cross arm. The cross arm carries lineally spaced tab-like fingers for stressingly engaging opposed surfaces of a taut bow string seated in lineally spaced off-set notches. The fingers bear stressingly and resiliently against forcibly to distort the bow string passing therethrough, thereby frictionally securing the bow square in place on the bow string. The cross bar also carries a hinged scale pivotal between a functional reference position adjacent the bow string and a stand-by position retracted from the bow string.

6 Claims, 6 Drawing Figures

BOW SQUARE

BACKGROUND OF THE INVENTION

The present invention relates generally to an archery gauge or checking device. More particularly, the invention is directed to a bow square for adjusting and checking the proper distance between the bow string and the hand grip of the bow (the "bracing height" or the "fistmehl"), as well as locating the optimum position for the nocking point on the bow string.

Each of these adjustments and settings is important to ensure accuracy and reliability in the use of the archery equipment. The accuracy achieved in archery is dependent to a marked degree on the proper stringing and tensioning of the bow and the establishment of correct spacing between the bow string and the bow handle. Ordinarily, the measurement or distance is in the range of from about seven to about nine inches. This, however, may vary for particular bows. The point on the bow string at which the arrow nock is placed so that each arrow is shot from the same reference position is known as the "nocking point." It will be appreciated that the correct location of these "points" is most important for consistent and accurate shooting of the arrow. The bow square of the present invention finds utility in the proper and optimum location for the "nocking point", and of the "kisser".

While the need for and the utility of bow squares has long been known to those interested in archery, and while such checking and calibration devices have taken various forms, none of those heretofore available has proven completely satisfactory in all respects. In some cases, the mode of attachment of the bow square to the bow string, in use, has posed problems. In still other instances, problems have been associated with placement of the reference scales for the nocking point in appropriate physical relationship with the bow string. It is, therefore, a principal aim of the present invention to provide an improved bow square which obviates many of the shortcomings of prior art devices and which may be used efficiently and effectively for accurately adjusting and checking the spacing between the bow string and the saddle of the bow grip, and for properly and accurately locating the nocking points on the bow string itself.

SUMMARY OF THE INVENTION

It is an important feature of the present invention that the bow square utilizes an improved attaching structure for grippingly securing the bow square to the taut bow string.

Another important feature of the invention is the provision of a nocking point gauge or scale which is pivotally shiftable on a "live" hinge between a functional reference position adjacent the bow string and a stand-by position retracted from the bow string. Other types of hinges may be used.

An important feature of the invention is that the mechanical means for securing the bow square on the bow string comprise lineally spaced tab-like fingers which stressingly engage opposed surfaces of the taut bow string, the latter being seated in lineally spaced notches formed in the tab-like fingers.

A related feature of the invention is that the bow string engaging fingers bear stressingly and resiliently against, forcibly to distort the bow string and form inflections therein, thereby frictionally securing the bow square in place.

Other and further objects, features, and advantages of the invention will become apparent upon consideration of the following specifications and the drawing.

DETAILED DESCRIPTION OF PREFERRED EMBODIMENT

The aims and objects of the invention are accomplished by providing in a bow square essentially rigid finger-like tabs adapted to embrace the bow string on opposed side surfaces thereof and tensionally to distort the bow string, thereby establishing secure frictional engagement and firm retention of the bow square on the bow string itself. An important collateral feature of the improved bow square is the provision of a hingedly pivotal scale carried by a transversely extending arm of the bow square and shiftable between a first position in which the scale is proximate and essentially overlies the bow string for reference thereto, and a second, retracted, position in which the scale is hingedly pivotally removed from the bow string.

Figure 1:
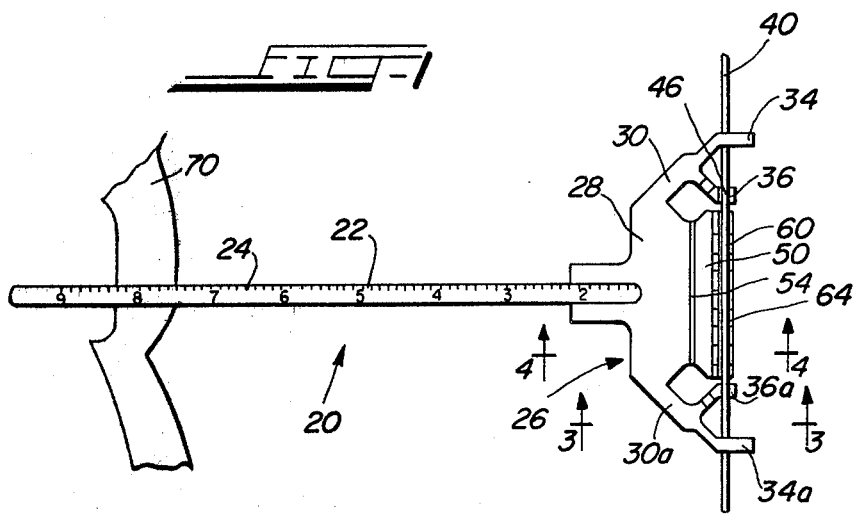
FIG. 1 is a side elevational view of the bow square of the invention mounted in place on the bow string of a bow.
Figure 2:
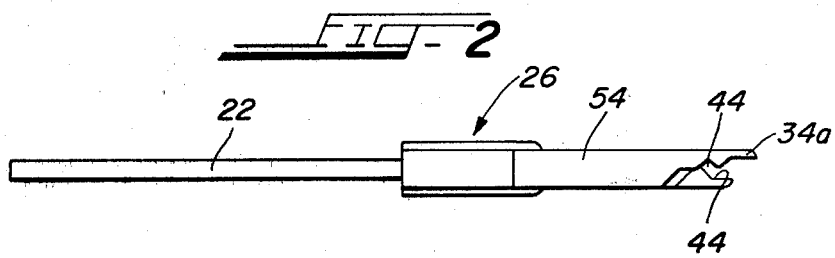
FIG. 2 is an edge elevational view.
Figure 3:
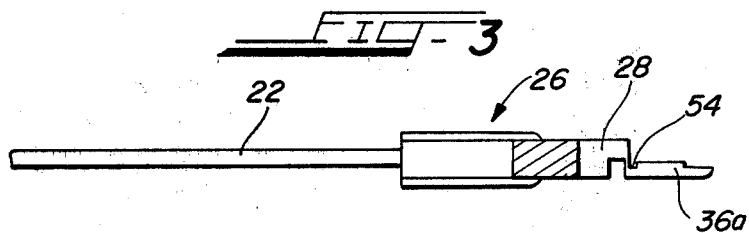
FIG. 3 is a cross sectional view taken substantially on the lines 3—3 of FIG. 1.
Figure 4:
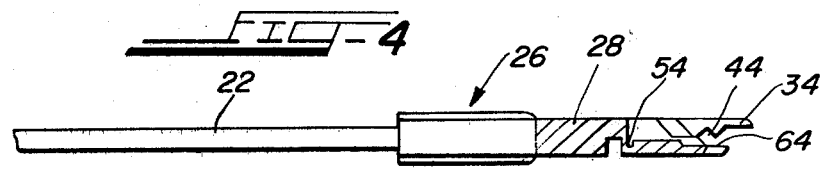
FIG. 4 is a cross sectional view taken substantially on the lines 4—4 of FIG. 1.
Figure 5:
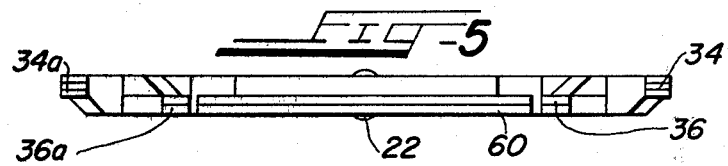
FIG. 5 is an end view of the bow square of the invention, taken from the bow string engaging end of the device.

Referring now to the drawings, and particularly to FIGS. 1 and 2, there is shown one preferred embodiment of the bow square of the invention provided for illustrative purposes and not to be construed in any limiting sense. The bow square 20 is generally T-shaped in form and includes an elongated measuring bar 22 carrying a scale indicia 26. The bar is about 11 inches long, about ½ inch wide, and about 5/16 inch in diameter. It may be fabricated of an suitable material, rigid plastic being preferred.

The measuring bar 22 carries at one end a transversely extending cross arm assembly 26 (about 4 inches wide) including a body 28 and a pair of legs 30 and 30a projecting therefrom. Each of the legs 30 and 30a terminates in a pair of tab-like fingers 34, 36 and 34a, 36a for stressed abutment against opposite side surfaces of the bow string 40 for bow string gripping engagement therewith to secure the bow square 20 in place on the bow string 40, as most clearly shown in FIG. 1. The tabs themselves are preferably formed on at least some of their faces presented to the bow string 40 with generally V-shaped indentations, notches or grooves 44 and 44a, the latter being in substantial axial alignment for accommodating the bow string extending linearly therethrough.

Figure 6:
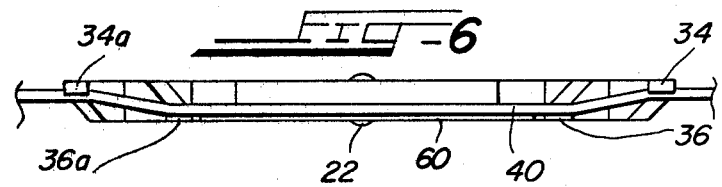
FIG. 6 is an end view similar to that of FIG. 5, but with the bow string shown as gripped in the spaced finger-like tabs of the bow square.

The orientation of the tab-like fingers 34 and 36 (and 34a and 36a) and the depth of the bow string receiving grooves 44 as formed therein are such as to preclude free and unobstructed passage of the bow string 40 through the grooves without distortion either of the bow string 40 or of the tab-like fingers 34, 36 and 34a and 36a themselves. In the specific preferred embodiment of the structure illustrated, the tab-like fingers have sufficient rigidity to withstand substantial distortional pressure forces applied thereto. As a result, upon functional positioning of the tabs to stress opposed sides of the bow string, the bow string 40 itself is distorted, forcibly, to assume a non-linear path, as indicated schematically in FIG. 6. That is, passage of a taut bow string 40 "between" the finger-like tabs 34, 36 (and 34a and 36a), produces inflections in the bow string and ensure interference contact between the bow string and the bounding walls of the tabs presented thereto frictionally to establish gripping engagement of the bow string by the tabs 34, 36 and 34a and 36a to support the bow square 20 in place on the bow string 40 and to resist objectionable free-sliding displacement lineally therealong.

The cross arm assembly 26 is integrally formed with the measuring bar 22, and both are fabricated of a semi-rigid plastic material such as polypropylene. As shown in FIG. 1, the body 28 of the cross arm assembly 26 is integrally joined to a web or register plate 50 attached to the body 28 of the cross arm assembly 26 along an integrally-formed hinge 54 consisting of a substantially thinned elongated sector disposed between the inside tabs 36 and 36a and generally paralleling the bow string 40 and displaced laterally thereof. At its outwardly directed free marginal zone 60, the web 50 is provided with a reference scale 64 for facilitating correct placement of nocking points (not shown) on the bow string 40. It will be appreciated that the hinge 54 is of the type known in the plastics art as a "live" hinge, being a thinned longitudinal flexible joinder element integrally formed with the cross arm body 28 itself and constituting a zone of flexure facilitating shift or pivotal displacement of the scale-carrying web 50 from a first, functional position proximate the bow string to a second, stand-by, position displaced or retracted from the bow string 40.

The marked reference scale 64 on the web 50 also facilitates the proper positioning of the kisser on the bow string.

It will be appreciated from the foregoing that the string (brace) height may be established by measuring the distance from the bow string 40 to the bow handle 70, and the proper distance marked on the scale 26. In a similar manner, the proper positioning of the nocking point and of the kisser may be marked on the scale 64 carried by the pivotal web 50.

The "retractable" or hinged feature of that section of the bow square which carries the indexing scale provides important advantages in the practice of the present invention. For example, the hinge permits the archer to position a nock indicator device on the bow string and then to fasten or secure the indicator on the string, without any need first to remove the bow square from the bow. Thus the final checking to ensure that there has been no shift of the marker during the securement step is faciliated. The hinged scale section, while preferably of plastic and integrally formed with the cross arm itself, may be a separate structural element fabricated of any suitable material, including metal.

While the present invention has been described with reference to a preferred embodiment, it will be appreciated that various changes modifications may be made, and it is intended to cover through the present application all such modifications which fall within the true spirit and scope of the appended claims.

What is claimed is:

1. In a generally T-shaped bow square for attachment to an archery bow for checking adjustment of brace height, nocking point, and kisser, and including a measuring bar for carrying a scale thereon, and a transversely extending cross arm having bow attachment means for releasably securing said bow square to a bow string, the improvement wherein said bow attachment means comprises a plurality of generally coplanar, substantially immobile individual tab-like fingers projecting from said cross arm, said fingers stressingly engaging opposed surfaces of a bow string of a bow at spaced positions along a bow-square-supporting lineal segment of the bow string, at least two of said fingers having walls defining substantially-in-line notch-like bow-string-receiving grooves delineating radial boundary elements of a restricted passageway for the bow string extending axially through said grooves, said bow string contacting fingers effectively limiting transverse dimensions of said passageway to obviate friction-free straight-line traverse of a bow string therethrough, string-contacting walls of said fingers defining a tortuous longitudinal passageway precluding interference-free traversal of a taut bow string therethrough, passage of a taut bow string through said passageway establishing frictional interference contact between the bow string and at least one passageway-bounding wall presented thereto and effecting temporary resilient distortional deformation of said bow string to provide tensionsl frictional gripping engagement between said bow srting and said fingers of said bow square to support said bow square on the bow string against free sliding displacement lineally therealong, and with said measuring bar extending at right angles to the bow string.

2. The improvement as set forth in claim 1 wherein said plurality of fingers comprise spaced pairs of fingers including one pair of proximately disposed fingers adjacent each of opposed upper and lower ends of said cross arm to define two linearly displaced bow string clamping zones.

3. The structure as set forth in claim 2 and further comprising scale-carrying register means pivotally supported on to extend along a longitudinal bow-string paralleling zone of said cross arm and selectively presentable to the bow string in a delineated zone, between said spaced pairs of fingers.

4. The structure as set forth in claim 3 and further comprising hinge means attached to and carried by said cross arm, said hinge means paralleling said cross arm and extending generally linearly therealong, scale indicia means being carried by said register means at a longitudinally extending free edge thereof, said hinge means pivotally interconnecting said cross arm with said register means and selectively permitting pivotal retractive displacement of said register means from the bow string, whereby said register-means-carried scale indicia means is selectively shiftable between a first position adjacent the bow string and a second position retracted from the bow string.

5. The structure as set forth in claim 4 wherein said cross arm is of a rigid plastic material and wherein said hinge means constitutes an elongated web of reduced thickness connecting said scale-carrying register means to said cross arm and defining an integrally formed live hinge therebetween.

6. The improvement as set forth in claim 1 wherein said fingers include bow string receiving grooves, and wherein said fingers bear upon a taught bow string seated in said groves of said fingers resiliently to stress and to distort the bow string, producing inflections therein, and causing the bow string to assume a non-linear path.

* * * * *